(12) United States Patent
Fries et al.

(10) Patent No.: US 7,466,814 B1
(45) Date of Patent: Dec. 16, 2008

(54) SWITCH CODE ROUTING MANAGEMENT METHOD AND SYSTEM

(75) Inventors: Jeffrey M. Fries, Wake Forest, NC (US); Zyad Ahmad Dwekat, Raleigh, NC (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1169 days.

(21) Appl. No.: 10/669,928

(22) Filed: Sep. 24, 2003

(51) Int. Cl.
*H04M 7/00* (2006.01)
(52) U.S. Cl. .............................. 379/221.14; 379/221.01
(58) Field of Classification Search ............. 379/221.14, 379/221.01, 219, 355.01, 220, 230, 229
See application file for complete search history.

(56) References Cited

U.S. PATENT DOCUMENTS 6,289,095 B1 * 9/2001 Buttitta et al. ......... 379/220.01
6,850,611 B1 * 2/2005 Chalk .................... 379/221.01
2006/0098799 A1 * 5/2006 Yablon ................... 379/221.14

* cited by examiner

*Primary Examiner*—William J Deane
(74) *Attorney, Agent, or Firm*—Sonnenschein, Nath & Rosenthal LLP

(57) ABSTRACT

The present invention provides a method and system for maintaining and updating records of the routing of switches in a telecommunication network. Routing information is retrieved from a routing guide, and corresponding routing information is retrieved from switches in the telecommunication network. Routing information is retrieved from switches by using the routing information from the routing guide to iteratively retrieve routing information from switches by NPA code, switch, rate center, and NXX codes. Routing information from the routing guide is compared to routing information retrieved from the switches and discrepancies in the routing information is identified. Identified discrepancies are corrected in either the routing guide or the routing of the switch.

23 Claims, 18 Drawing Sheets

US 7,466,814 B1

SWITCH CODE ROUTING MANAGEMENT METHOD AND SYSTEM

CROSS-REFERENCE TO RELATED APPLICATIONS

None.

STATEMENT REGARDING FEDERALLY SPONSORED RESEARCH OR DEVELOPMENT

None.

TECHNICAL FIELD

This invention relates to the field of telecommunications. More particularly, the present invention provides a new system and method for maintaining and updating the code routing of switches in a telephony network.

BACKGROUND OF THE INVENTION

Virtually everyone in the United States, and most of the world, is familiar with modern telephony systems. By simply entering a numeric code into a unit with an appropriate connection to a telephony network, the user may connect to another unit connected to the telephony network or connected to another telephony network linked to the first user's telephony network. The connection between units over the one or more telephony networks utilizes at least one, and often a plurality, of telephony switches to route a signal, whether circuit-based or packet-based, from the first user's unit to the recipient's unit.

Of course, the typical user of a telephony network does not think of its use in the above terms. Rather, the user simply thinks of picking up his or her telephone, dialing the desired phone number, and speaking with the person who answers the call. The phone number dialed by a user placing a call is a code that is used by telephony switches to route the connection between the caller's telephone and the telephone receiving the call.

Because a call is routed by telephony switches using the digits dialed by a user, the proper programming of switches is critical to the proper function of the telephony network. Not only is proper programming of switches required to connect a call to the right end-point via the correct facility path to the proper service provider, it is also required to assure that that call is billed properly. For example, whether a call is a free local call or a toll long distance call, or another variety of call, depends upon the programming of telephonic switches to determine, based upon the source of the call and the code dialed, how the call should be billed.

Maintaining properly programmed switches to correctly route and bill calls can be an involved process. The addition of new telephony hardware, such as new switches and new trunks, often requires changes in one or more switches to properly route calls. Recent growth in telephony networks, due to a variety of issues such as the growth of wireless telephone usage and the number of new competitive local exchange carriers (CLECs) entering the field, has further complicated this task by increasing the total number of phone numbers in use. One method of accommodating the growth in telephony is the creation of new area codes to accommodate the new telephone numbers, as well as the creation of new NXX codes, which are the three digits following the area code in the United States. Properly routing calls involving such new telephone numbers requires the programming, or reprogramming, of telephony switches.

The establishment of a new area code or a new NXX code requires that switches, typically a large number of switches, be reset to properly route and bill calls to and from those new codes. This need to program switches to accommodate new NPA and new NXX codes is in addition to reprogramming necessary to other changes, such as new telephony equipment. The method of programming switches to route and bill calls is well known in the art, and not addressed herein. The ever increasing demand upon telephony network operators to maintain records of routing changes to be made, planning and implementing changes in routing, and confirming those changes in the face of expanding codes has challenged telephony network operators. The need therefore exists for an improved method and system for managing the routing of these dialable codes in the telephony switches.

BRIEF SUMMARY OF THE INVENTION

The present invention provides a system and method for maintaining information regarding existing network routing, for receiving information identifying needed routing changes, itemizing needed changes for network technicians, proposing possible routing changes in some scenarios, and updating the existing routing information after routing has been completed. The present invention may be implemented using software to create a web-based program to allow a diversity of users to access routing information, with security measures to assure that only authorized translation engineers can input new routing information.

BRIEF DESCRIPTION OF THE SEVERAL VIEWS OF THE DRAWING

The present invention is described in detail below with reference to attached figures, wherein.

DETAILED DESCRIPTION OF THE INVENTION

The present invention provides a system and method whereby a telecommunication network operator may maintain preexisting routing information, may receive needed routing changes in an orderly fashion, may propose routing changes in an automated manner, may maintain records of routing changes to be made, may confirm that routing changes have been timely completed, and may update existing routing information to include confirmed routing changes.

Figure 1:
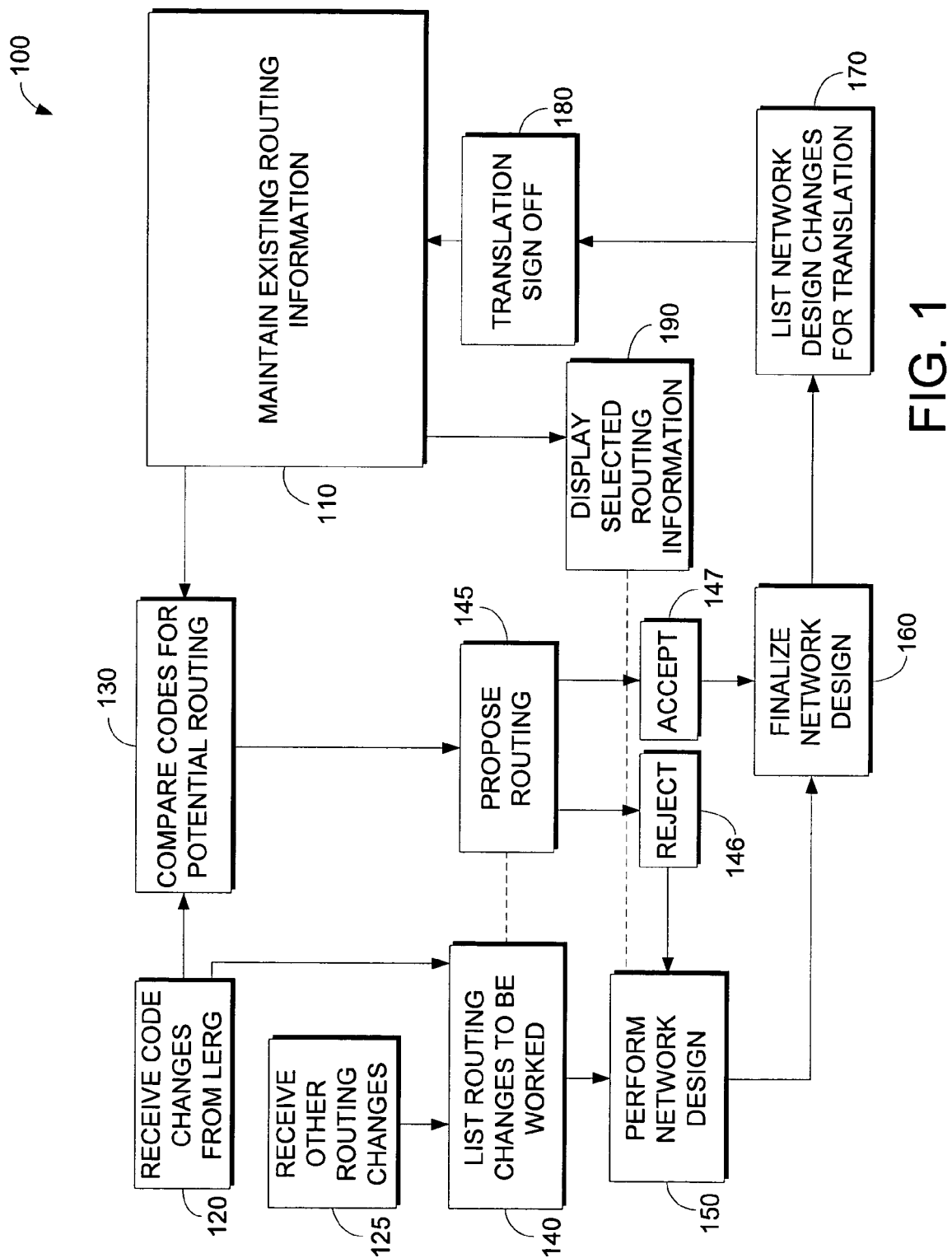
FIG. 1 illustrates a method in accordance with the present invention.

FIG. 1 illustrates a method 100 in accordance with the present invention. Step 110 maintains existing routing information. Routing information maintained in step 110, may comprise, for example, where to connect a call based upon the dialed code, the intermediate routing of a call through telecommunication infrastructure such as trunk groups and other telecommunication equipment, and the billing of a call based upon its point of origin and point of termination. Step 110 may be performed using any acceptable database system to record and maintain routing information for the switches in the telephony network. Step 110 may also comprise maintaining information identifying existing telephony equipment, such as switches and trunk groups. This information regarding telephony equipment may be periodically updated.

In step 120 code changes are received from the LERG. The LERG, or Local Exchange Routing Guide, is a United States telecommunication industry data base that contains information pertinent to the routing of all working NPA-NXX codes in the North America Numbering Plan. Periodically, the LERG issues industry code changes such as the establishment of new NPA codes and new NXX codes. All telephone service providers in the United States subscribe to the LERG and are responsible for maintaining the network information for each NXX code that they are assigned. Updates to routing information, such as the entry of a new NXX code or changes to routing information on existing codes, may be transmitted electronically to subscribing service providers as one way of performing step 120. Outside of the United States, or within the United States should the telecommunication regulatory environment change, step 120 may comprise receiving code changes from any appropriate group or agency. The types of code changes received in step 120 may be of any variety. It should be noted that multiple code changes may be used to implement what may appear to a customer as a single code change, such as the creation of a new area code. For example, if a preexisting area code is split, resulting in some dialable numbers within the preexisting area code receiving a new area code, both the new and old area codes may remain dialable for a transitional period of time, requiring routing changes to make the new area code dialable for telecommunication network users. At the end of the transition period of time, the old area code should no longer function to route calls to numbers with the new area code, requiring an additional routing change to render the numbers no longer within the old area code undialable. Thus, in the present example both the addition of an NPA code and the elimination of an NPA code would be required routing changes.

In step 125 routing changes may be received from sources other than the LERG. NPA or NXX code changes received in step 125 may be, for example, routing changes made by the personnel or automated systems of a telecommunication service provider due to usage alterations, the availability of new hardware such as telecommunication trunks, the temporary or permanent loss of hardware such as telecommunication trunks, a decision by a network engineer to reallocate traffic to better use available band width, or any other consideration. Step 125 provides a way for method 100 to receive routing changes in addition to those implementing code changes.

Code changes received from the LERG in step 120 can be compared with the codes of the existing routing information in step 130. Step 130 may identify code changes that may possibly be routed using routing information from the existing routing information. For example, code changes may involve NXX codes that are simply being assigned to a new area code, or that are otherwise being changed in a predictable fashion. If an NXX code, for example, has simply been changed to a new NPA code, it is likely that only the NPA code of the routing information for that NXX code has been changed, with other information such as the termination point, the trunk groups used to carry a call, and the local calling plan information remaining unchanged. This may allow appropriate computer software to propose routing for a code change in step 145, for example by duplicating existing routing information for intermediate connections and calling plan information. It should be noted that some code changes received from the LERG in step 120 may not be matched with an existing NXX code by comparison step 130. This situation may occur, for example, when an entirely new NXX code is created. In this and other instances, there may be no routing proposed in step 145 for a code change in step 120.

Needed routing changes, whether code changes received from the LERG in step 120 or routing changes received in other ways in step 125, are listed in step 140. Step 140 may sort the daily LERG activities and present them to network design engineers, who then create the code activities that are subsequently loaded in the telephony switched by the translators. Step 140 of listing routing changes to be worked may be done in conjunction with the proposal of routing in step 145, although it should be recalled that some routing changes may not have a corresponding proposed route and that proposed routing is not necessary to the practice of the present information If a routing plan is proposed in step 145, a network engineer or other appropriately trained telecommunication service provider personnel may either reject the proposed routing in step 146 or accept the proposed routing in step 147. If a network design engineer or other personnel accepts the proposed routing in step 147, method 100 proceeds to the finalization of network design in step 160. If the network design engineer or other personnel rejects the proposed routing in step 146, or if there is no proposed routing, method 100 proceeds to the network design step 150.

In network design step 150 a network design engineer or other trained personnel designs the telephony network routing for the code change. The routing prepared in the network design step 150 may comprise, in part, what trunk groups to use to carry connections and how to bill calls between particular codes. If information identifying existing telephony equipment is maintained in step 110, routing information entered by a network design engineer in conjunction with design step 150 may be compared to the information identifying the existing telephony network to confirm that the information entered by the engineer corresponds to existing equipment. In conjunction with the network design step 150, information regarding the existing routing may be displayed in step 190. The display of existing routing information in step 190 may be beneficial to a network design engineer or other personnel involved in the network design step 150 to compare existing routing information for other codes to possible routing for a code change.

In the finalization of network design step 160, the network design accepted in step 147 or the network design created in step 150 is finalized and input into the system so that those routing changes may be made in the relevant telephony switches. The system then lists network design changes for translation in step 170. Translation refers to the process of inputting routing information into telephonic switches so that the designed routing actually occurs when a call is placed. The list of network design changes in step 170 are the actual changes to be made by a translation engineer in telephonic switches to effectuate the needed routing changes.

After the translation engineer or other personnel completes the routing changes in the appropriate telephonic switches, he or she confirms the completion of the routing changes in translation sign-off step 180. Information affirmed in the translation sign-off step 180 is input into and thereafter maintained with the existing routing information as part of step 110.

It should be realized that method 100 illustrated in FIG. 1 is illustrative only. The use of terms such as NPA and NXX to refer to portions of telephonic codes in conformance with current United States telecommunications network terminology. While the terminology might change, the present invention may be used in conjunction with telephony systems that use different code designations, for example, systems employed outside of the United States. It should also be realized that steps such as receiving other routing changes 125, proposing routing, 145, comparing codes for potential proposed routing 130, and displaying existing network information 190 may be omitted without departing from the scope and spirit of the present invention.

Figure 2B:
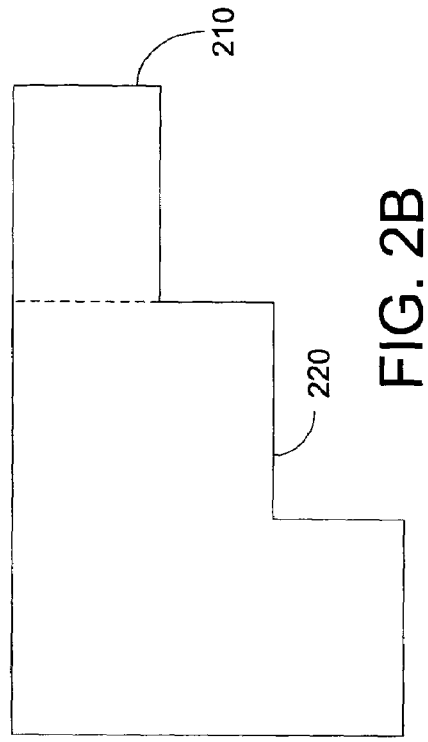
FIG. 2B illustrates the geographical extent of two area codes after an area code split.
Figure 2A:
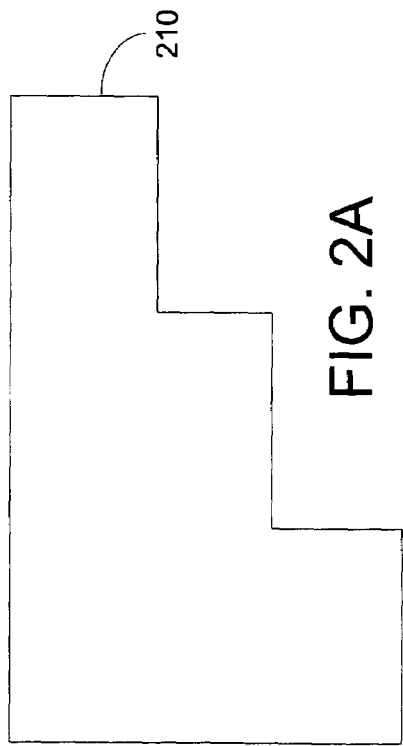
FIG. 2A illustrates the geographical extent of a preexisting area code.
Figure 2C:
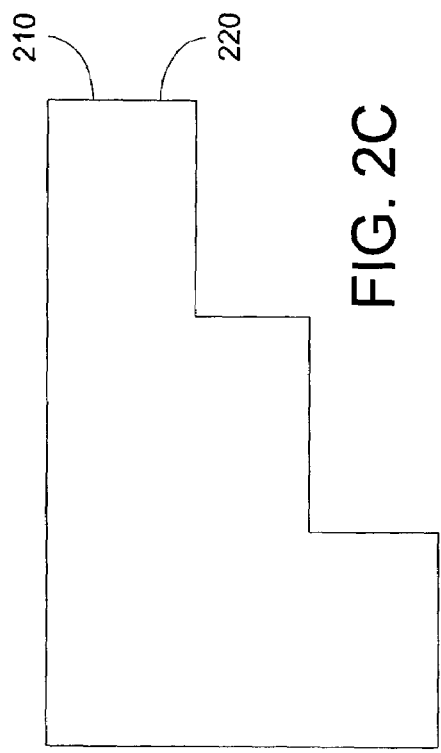
FIG. 2C illustrates the geographical extent of two area codes after an area code overlay.

Two examples of NPA changes that may require routing changes implemented using the present invention are illustrated in FIG. 2. It should be appreciated, however, that the present invention may be used to implement any new routing or any routing change, not only NPA changes such as are illustrated in FIG. 2. Referring now to FIG. 2A, the geographical extent 210 of an existing area code is illustrated. In FIG. 2B, that preexisting geographical area has been split into a first geographical area 210 that retains the prior area code, and a second geographical area 220 covered by a new area code. FIG. 2B is a representation of what is known in the art as an area code split, where existing telephony network users are assigned a new area code based upon their geographical location. FIG. 2C illustrates an area code overlay. First geographical area 210 serviced by a first area code corresponds exactly with a second geographical area 220 serviced by a second area code. An area code overlay occurs, for example, when new telephony network subscribers in a particular area or region are assigned a new area code, with existing telephony network users in that area not being required to change area code based upon their geographical location. The present invention may be employed to facilitate the change of routing information and switches required to comply with either of the changes illustrated in FIG. 2B or in FIG. 2C. The present invention may be utilized to manage and implement routing changes well beyond those illustrated in FIG. 2, such routing changes required by the creation or deletion of NXX codes within an existing NPA code, due to the addition or loss of equipment, or due to other routing considerations.

The method in accordance with the present invention may be implemented in a variety of fashions. One embodiment of a system implementing the present invention is the use of a computer program to maintain, receive, process, and display information regarding telephony network routing and to implement method 100. A computer program implementing a method in accordance with the present invention may be implemented in computer readable code on a computer readable media to cause a computer to perform the steps of the method. Such computer software may take any form within the scope of the present invention, but the use of web-based software allows a plurality of users to utilize the present invention, and allows for the use of known software protocols and methods to implement the new method of the present invention.

Figure 3:
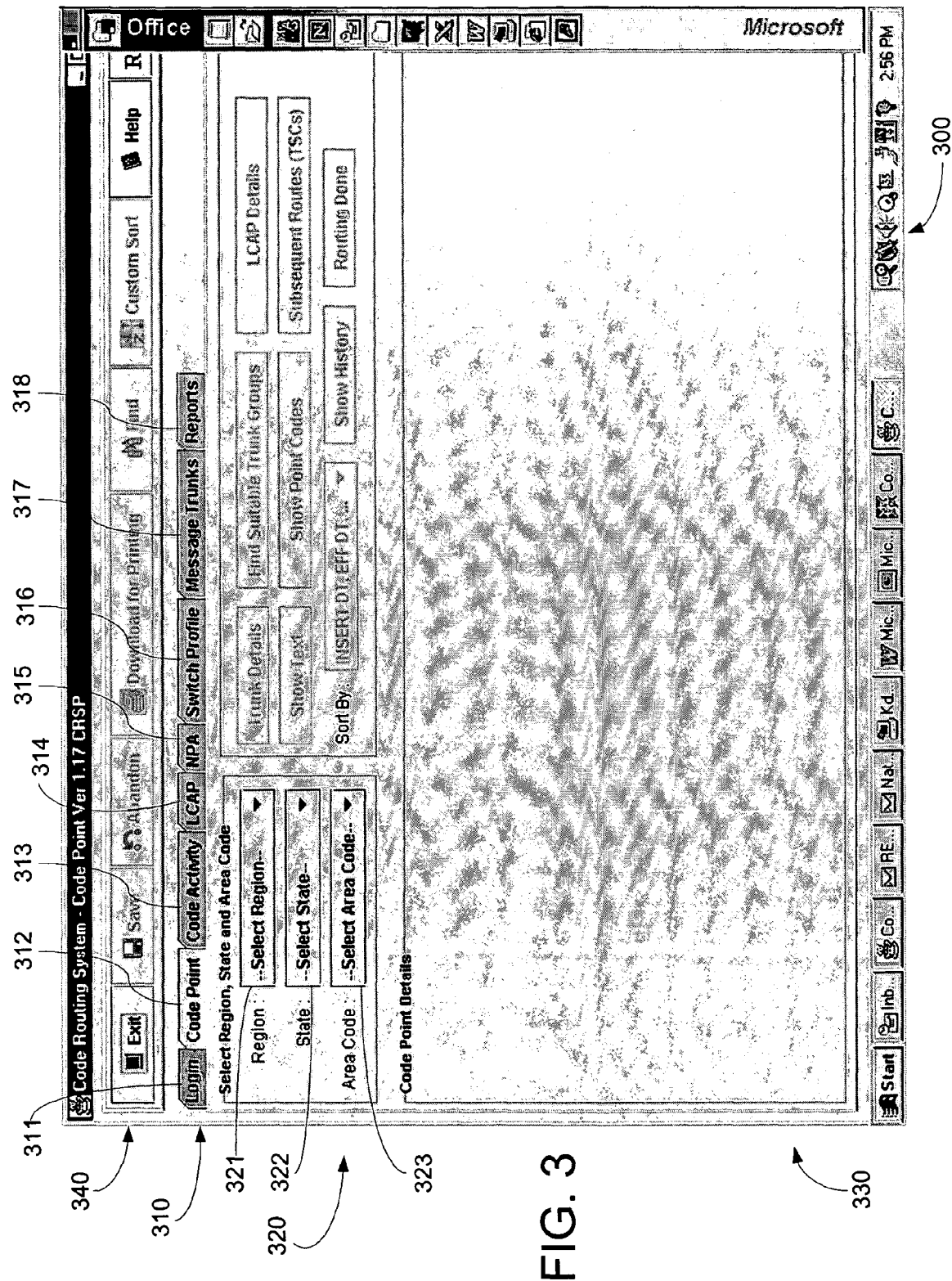
FIG. 3 illustrates a Graphical User Interface for software in accordance with the present invention.

Referring now to FIG. 3, a graphical User Interface 300 of one embodiment of software implementing a method in accordance with the present invention is illustrated. The computer software in accordance with the present invention may employ a user positionable curser that may be used to select a portion of the graphical User Interface 300 to indicate a particular selection, by using a "mouse" or similar device known in the art. The graphical User Interface 300 may include a variety of components. Tabs 310 may indicate different types or categories of information that may be displayed to or input by a user. For example, log in tab 311 may provide a means for users to verify their authority to use the computer software, or may allow users to indicate the degree of access they are authorized to exercise, for example, the ability to update information within the system or to merely view information within the system. Other tabs 310 that may be used in accordance with the present invention include a code point tab 312, a code activity tab 313, an LCAP tab 314, an NPA tab 315, a switch profile tab 316, a message trunks tab 317, and a reports tab 318. Each of these tabs 310 will be discussed in further detail below. While the types of input available and information displayed via the graphical User Interface 300 will vary depending upon which tab 310 a user selects, it may include a user selection area 320 that may include methods for a user to input information particularly identifying the information for display using methods such as pull-down menus and buttons. The graphical user interface 300 may further include an information display pane 330 to display information responsive to user inputs. Control buttons 340 may also be included in the graphical User Interface 300. Control buttons 340 may be employed to perform a variety of functions for a user, such as exiting the software, saving a file created using the software, abandoning changes made using the software to revert to an earlier state, downloading a file to print, performing searches or finds, sorting information, or obtaining help regarding how to use and operate the system.

As illustrated in FIG. 3, the code point tab 312 has been selected. Area 320 includes pull-down menus to allow a user to select region 321, to allow a user to select a state 322, and to allow a user to select an area code 323. The region may be as defined by the telecommunication service provider, but may comprise different predefined regions of the United States.

Figure 4:
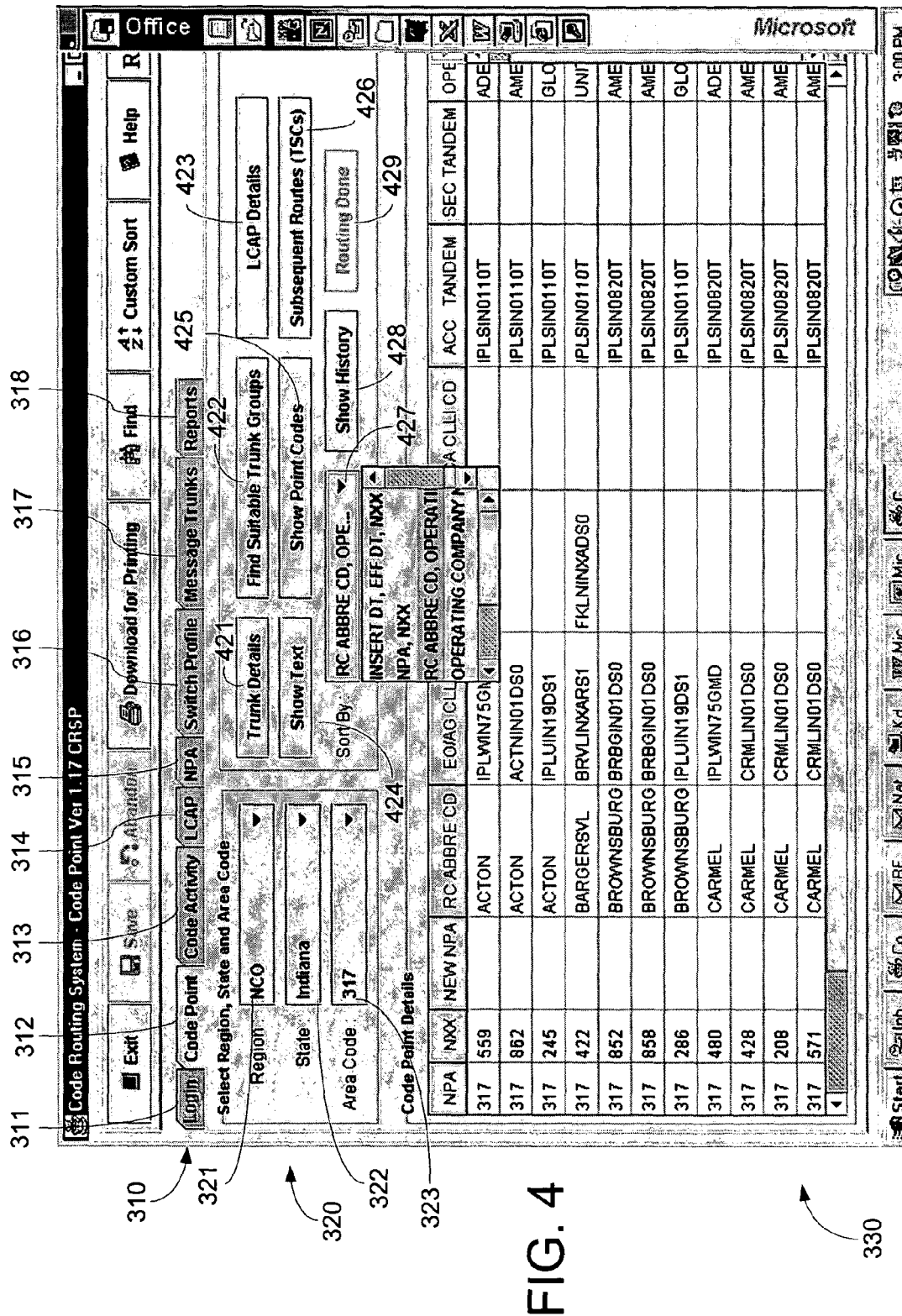
FIG. 4 illustrates a Graphical User Interface for software in accordance with the present invention.

Referring now to FIG. 4, the graphical User Interface 300 of an example of software implementing an embodiment of the present invention is illustrated further. As seen in FIG. 4, the code point tab 312 is still selected, with information being input to select a region from pull-down menu 321, a state from pull-down menu 322, and an area code from pull-down menu 323. Switch information corresponding to the selections made using area 320 are displayed in panel 330. Further selection options are available in area 320, including the trunk detail button 421, the find suitable trunk groups button 422, the LCAP details button 423, the show text button 424, the show point codes button 425, the subsequent routes button 426, the sort by pull-down menu 427, and the show history button 428. The routing done button 429 is not yet active, as no routing operations have been performed as illustrated in FIG. 4. The display panel 330 provides information regarding switches in a table format. As shown in FIG. 4, different columns of the table display different code point information. For every code point, the table in panel 330 identifies the NPA, the NXX, the new NPA if one exists, the rate center abbreviation, the end office CLLI code, which is useful in programming switches, and other information useful in routing connections in switches.

Figure 5:
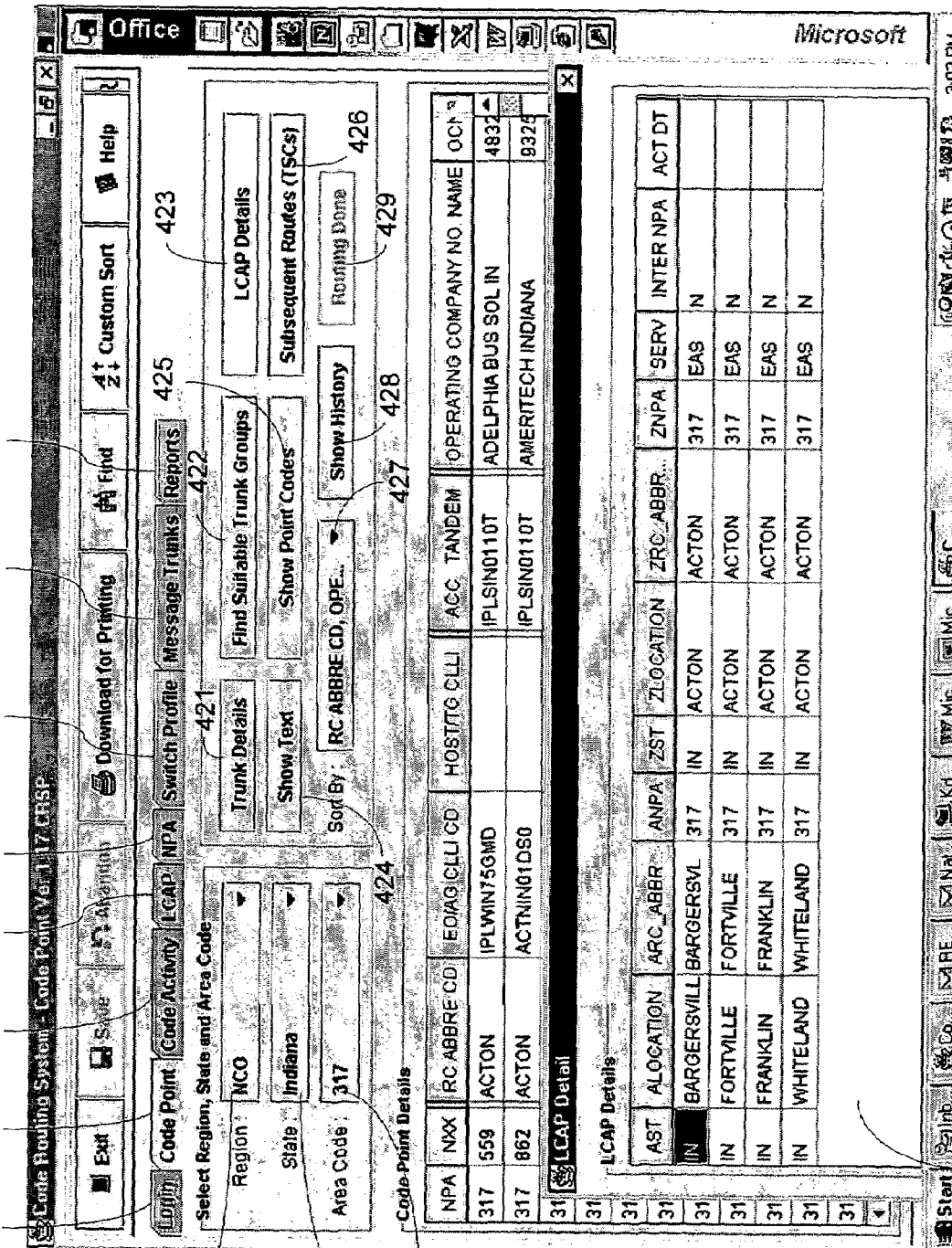
FIG. 5 illustrates a Graphical User Interface for software in accordance with the present invention.

Referring now to FIG. 5, the result of a user selecting the LCAP details button 423 is illustrated. LCAP stands for local calling area plan, and the selection of the LCAP details button 423 results in a new window 500 displaying information germane to the selected local calling area plan. The new window 500 displaying LCAP details reflects which rate centers have local calling to the selected NPA-NXX code. This information may be required to correctly make routing changes that reflect the local calling area plan for a particular point.

Figure 6:
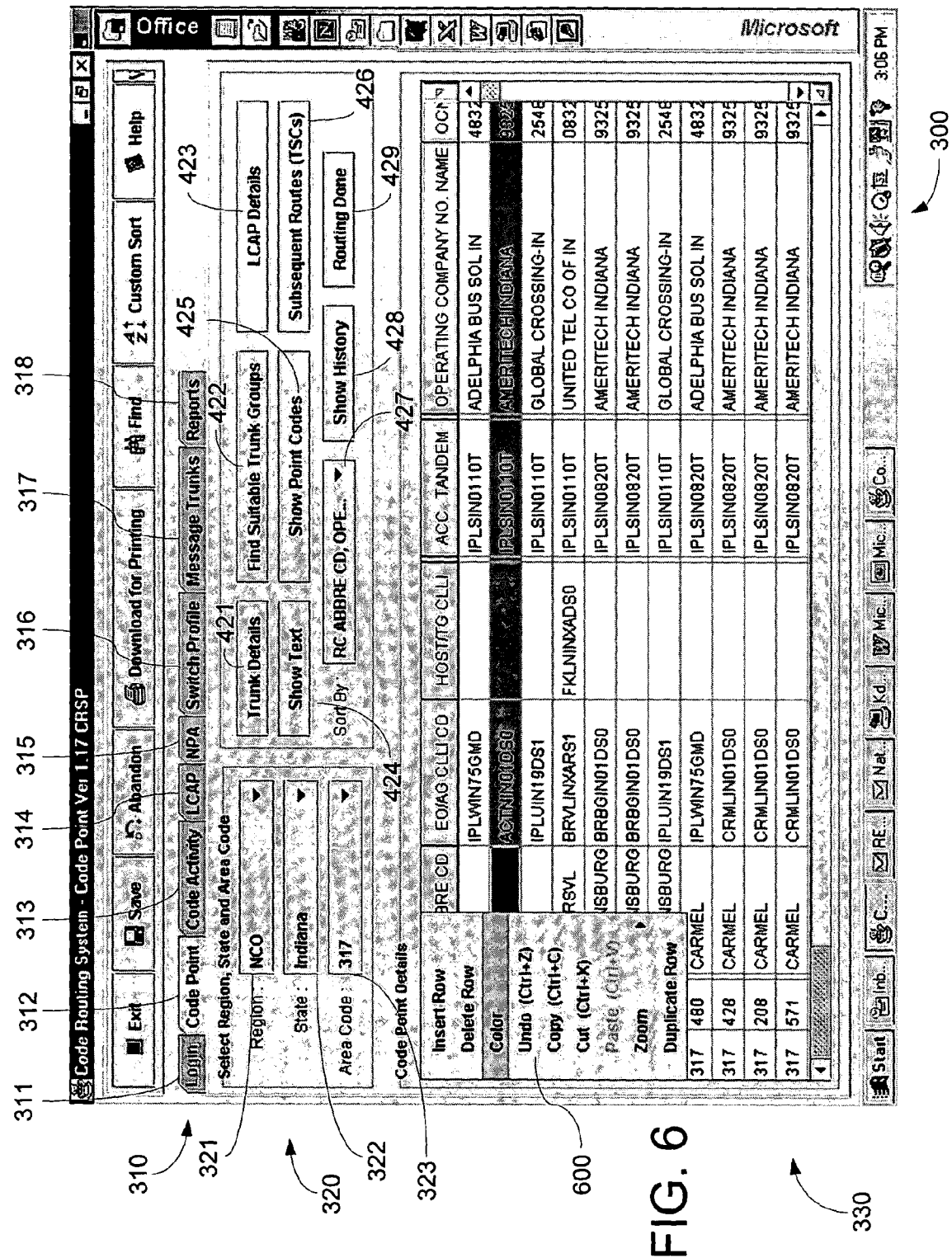
FIG. 6 illustrates a Graphical User Interface for software in accordance with the present invention.

Referring now to FIG. 6, further aspects of the graphical User Interface 300 of an example of software implementing a method in accordance with the present invention is illustrated with the code point tab 312 selected. Through an appropriate predefined action, such as right clicking on a two button mouse, the user may perform editing functions using pop-up menu 600. Editing functions may be functions such as inserting a row, deleting a row, adding color, undoing prior edits, copying materials, cutting materials, pasting materials that have been cut or copied, zooming upon particular sections of the display, or duplicating rows. The provision of editing functions, such as through use of pop-up menu 600, can facilitate the inputting of information regarding the changes made to routing in accordance with a method of the present invention.

Figure 7:
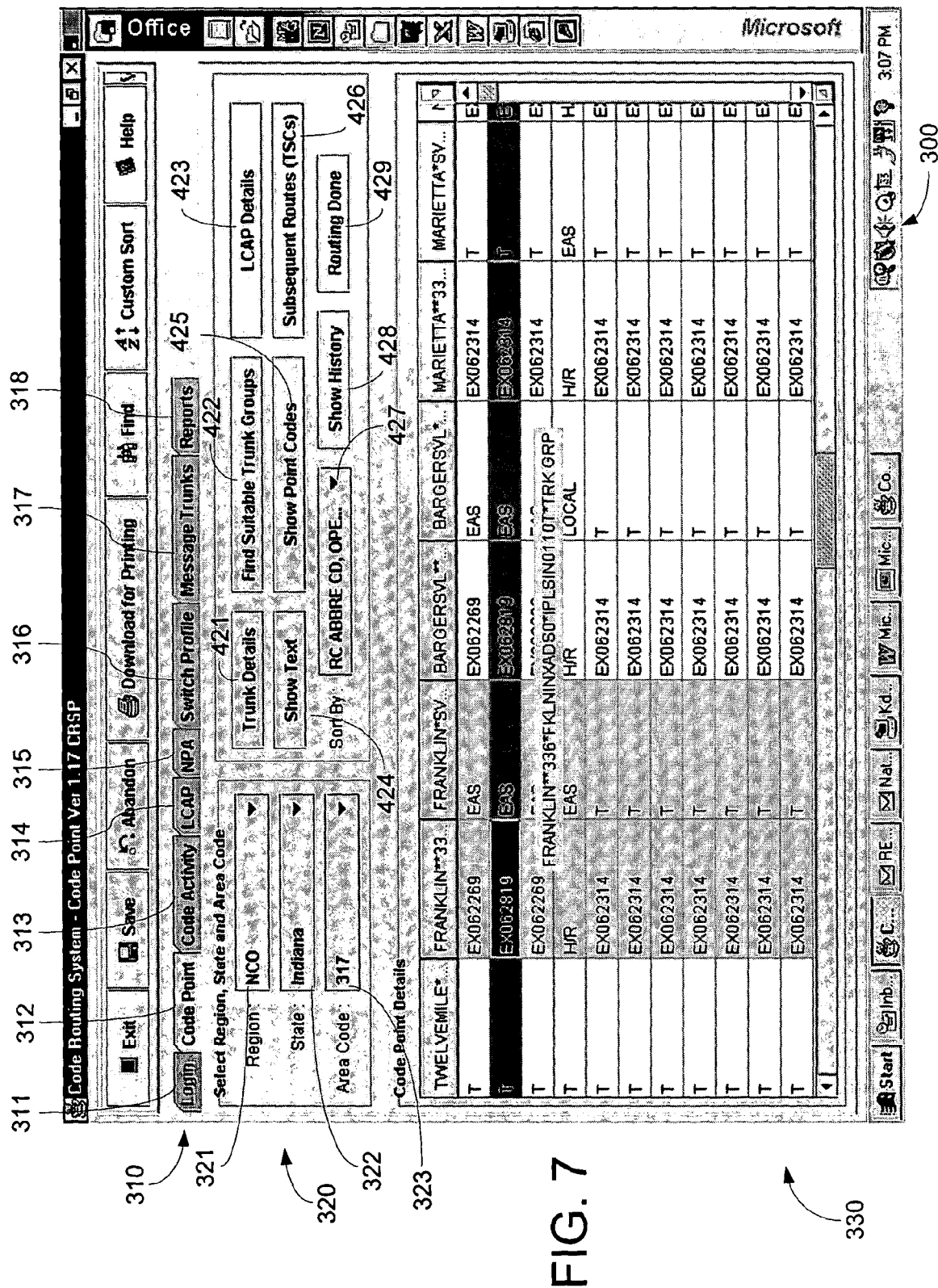
FIG. 7 illustrates a Graphical User Interface for software in accordance with the present invention.

Referring now to FIG. 7, editing actions performed using pop-up menu 600 are illustrated. In the example illustrated in FIG. 7 a row in display panel 330 was selected and is indicated by the highlighting. The pop-up menu allows the engineer to select materials that may be copied or removed through cutting. FIG. 7 further illustrates the routing capabilities of the present invention. The names of the rate centers where that service provider serves customers are displayed. As illustrated in example of FIGS. 4-7, the row highlighted in FIG. 7 corresponds to the NPA-NXX code 317-862. FIG. 7 illustrates how, in accordance with the present invention, the selected NPA-NXX code is routed when dialed from the FRANKLIN, BARGERSVL, and MARRIETTA rate centers. In this example, when the 317-862 NPA-NXX code is dialed from FRANKLIN the service type of the call is "EAS", which means a local call, and the routing for the code is EX062819, which is a trunk group from the Franklin switch to the Acton switch (this trunk information is illustrated in the pop-up window in FIG. 8). It should be further noted that in the example illustrated in FIG. 7 that the columns for the FRANKLIN switch are highlighted. This signifies that this switch is a HOST switch in the network. The switches that follow which are not highlighted, such as BARGERSVL and MARRIETTA, are remotes of the FRANKLIN switch. In further reference to the example illustrated in FIG. 7, a call from MARRIETTA to the 317-862 NPA-NXX code is routed on trunk group EX062314 with a TOLL service type, designated by a T, rather than an EAS service type that a call dialed by a customer in the FRANKLIN rate center would receive.

Figure 8:
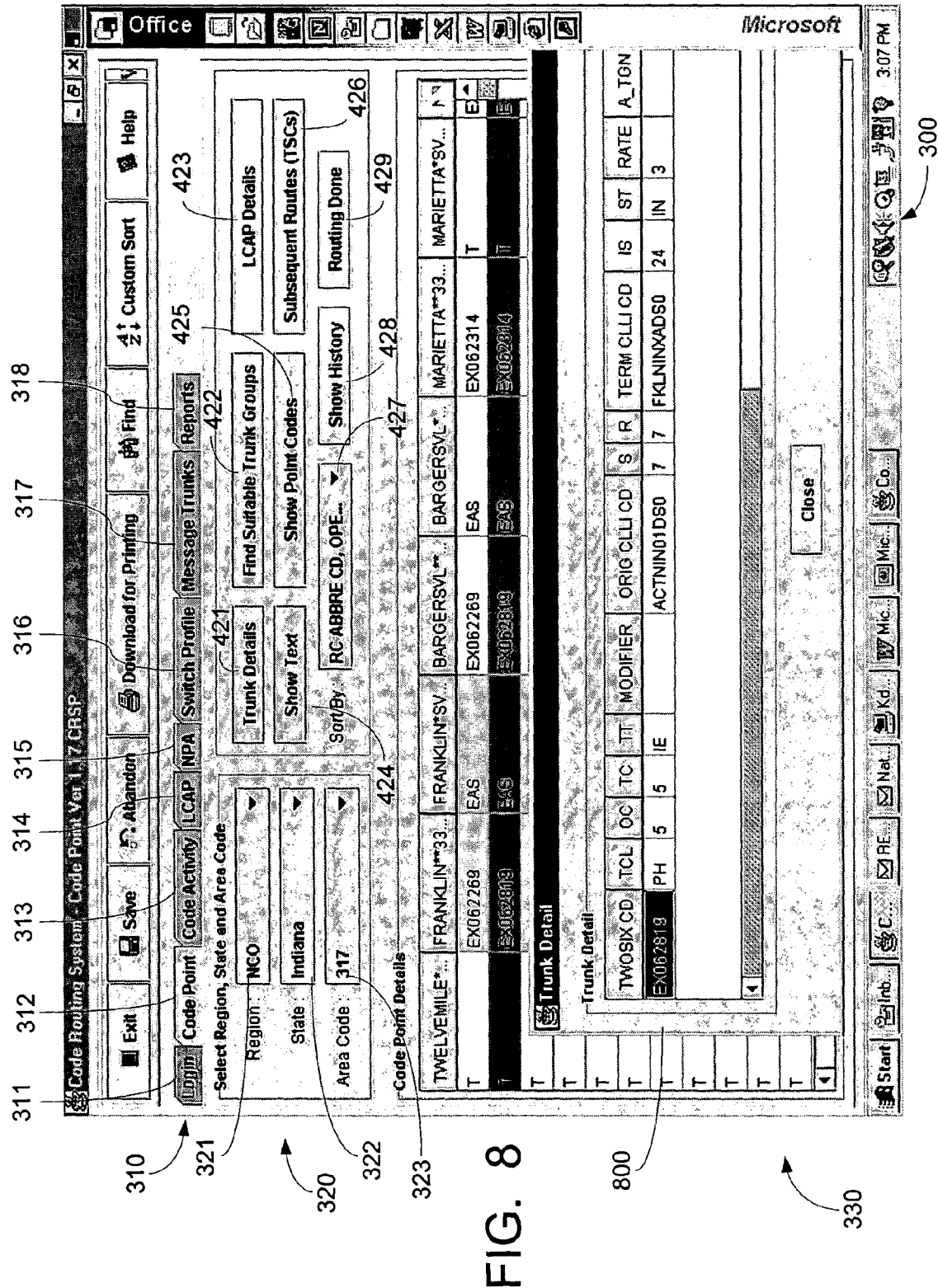
FIG. 8 illustrates a Graphical User Interface for software in accordance with the present invention.

Referring now to FIG. 8, a pop-up display 800 resulting from the selection of the trunk details button 421 is illustrated. A trunk is one or more high bandwidth telecommunication cables connecting switches or other telecommunication network hardware. The display of trunk detail is useful in determining appropriate and available routing possibilities using trunks. The pop-up display 800 includes information describing the trunk of the selected items relevant to a network engineer designing route changes.

Figure 9:
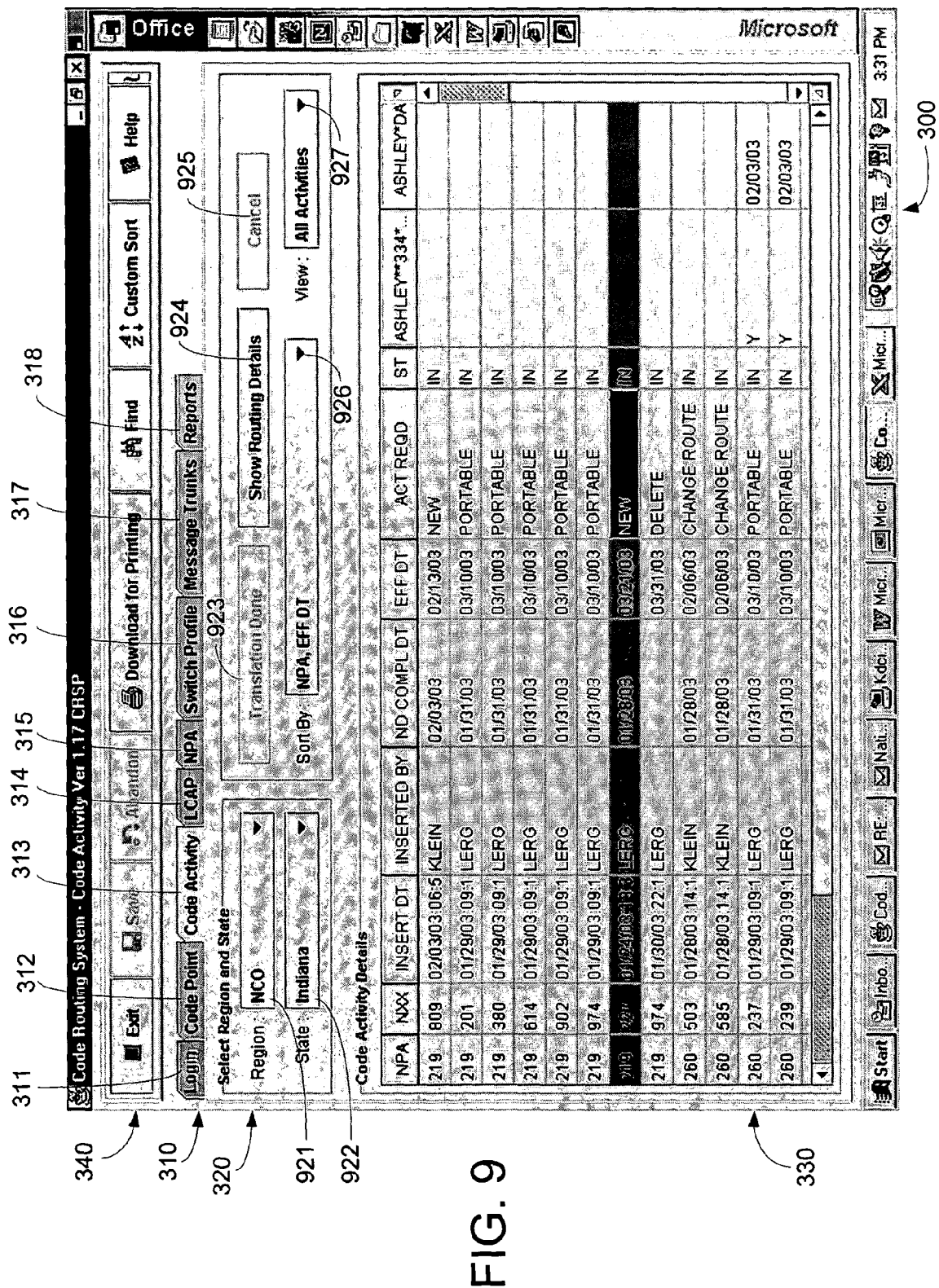
FIG. 9 illustrates a Graphical User Interface for software in accordance with the present invention.

Referring now to FIG. 9, the graphical User Interface 300 is illustrated with the code activity tab 313 selected. The code activity tab 313 is used to list and identify routing changes requiring either evaluation or design by a network engineer. Section 320 includes a pull-down menu for region 921 and a pull-down menu for state 922. Area 320 further includes buttons, some of which may be inactive depending upon what is selected in display panel 330. These buttons include the translation done button 923, the show routing details button 924, the cancel button 925, the sort by pull-down menu 926, and the view pull-down menu 927. Based upon the selections made in area 320, the display panel 330 will include information identifying NPA and NXX codes requiring network routing design due to code changes. The information displayed may include the NPA code, the NXX code, the insertion date, which indicates the date on which the needed change was input into the system, the source of the insertion, such as from the LERG or from a network design engineer who perceived a need for a routing change, the date on which the network design must be completed, the effective date of the routing change, the type of action required, such as the creation of a new NXX code, the portable change of an NXX code, the deletion of an NXX code, or the change and the route for an NXX code. The display panel 330 may further indicate information such as the state included in that NPA code or in NXX code, and the switches within that state and that NPA code. A date may be inserted to indicate when translation was performed on a given switch. An indicator, such as an alphanumeric character like a Y, may be used to indicate that a particular routing change requires translation in a particular switch.

Figure 10:
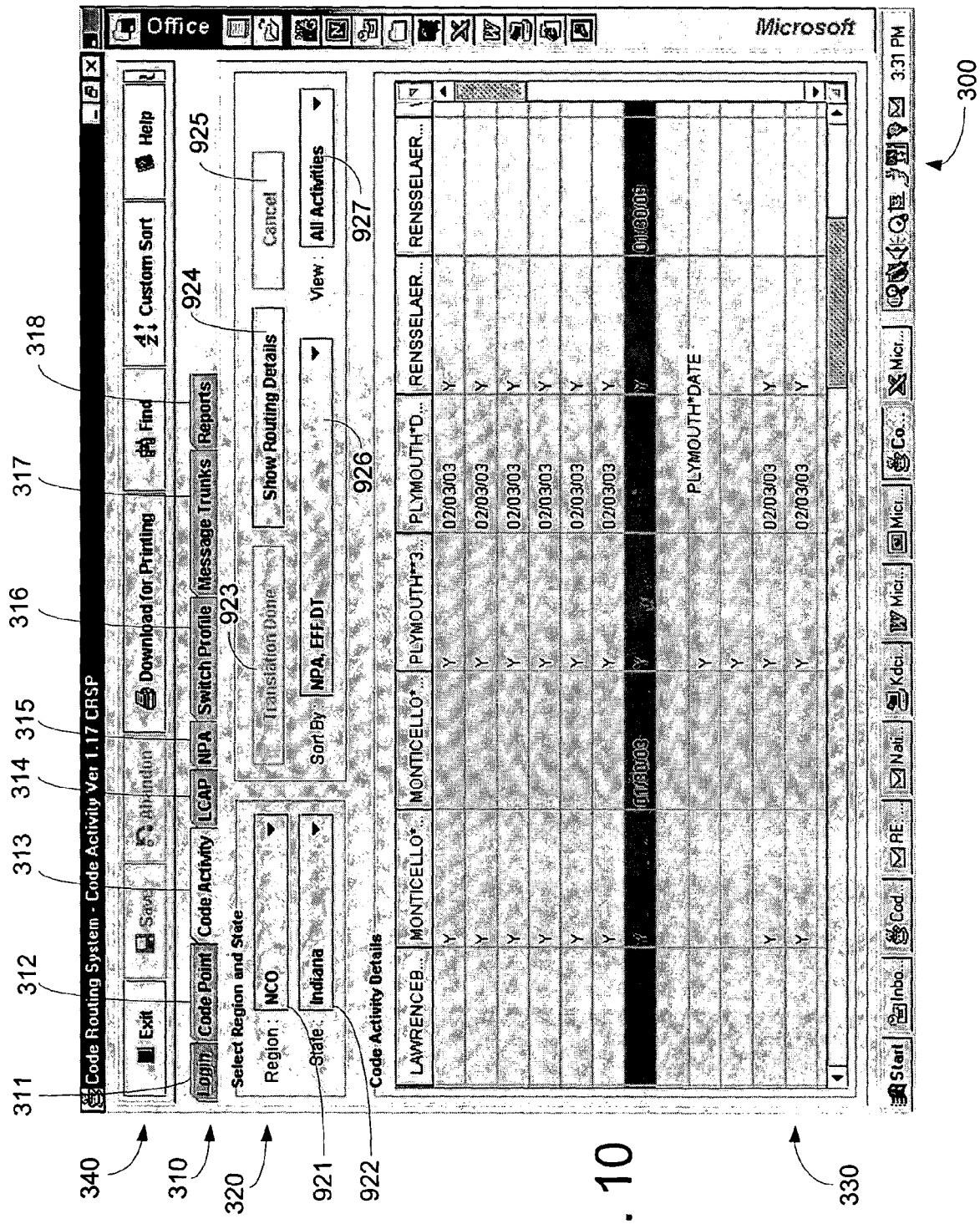
FIG. 10 illustrates a Graphical User Interface for software in accordance with the present invention.

Referring now to FIG. 10, additional information displayed in display panel 330 of graphical User Interface 300 with the code activity tab 313 selected is illustrated. As shown in FIG. 10, the display panel 330 has been scrolled to the right from that in FIG. 9, indicating further switches involved for the various routing changes.

Figure 11:
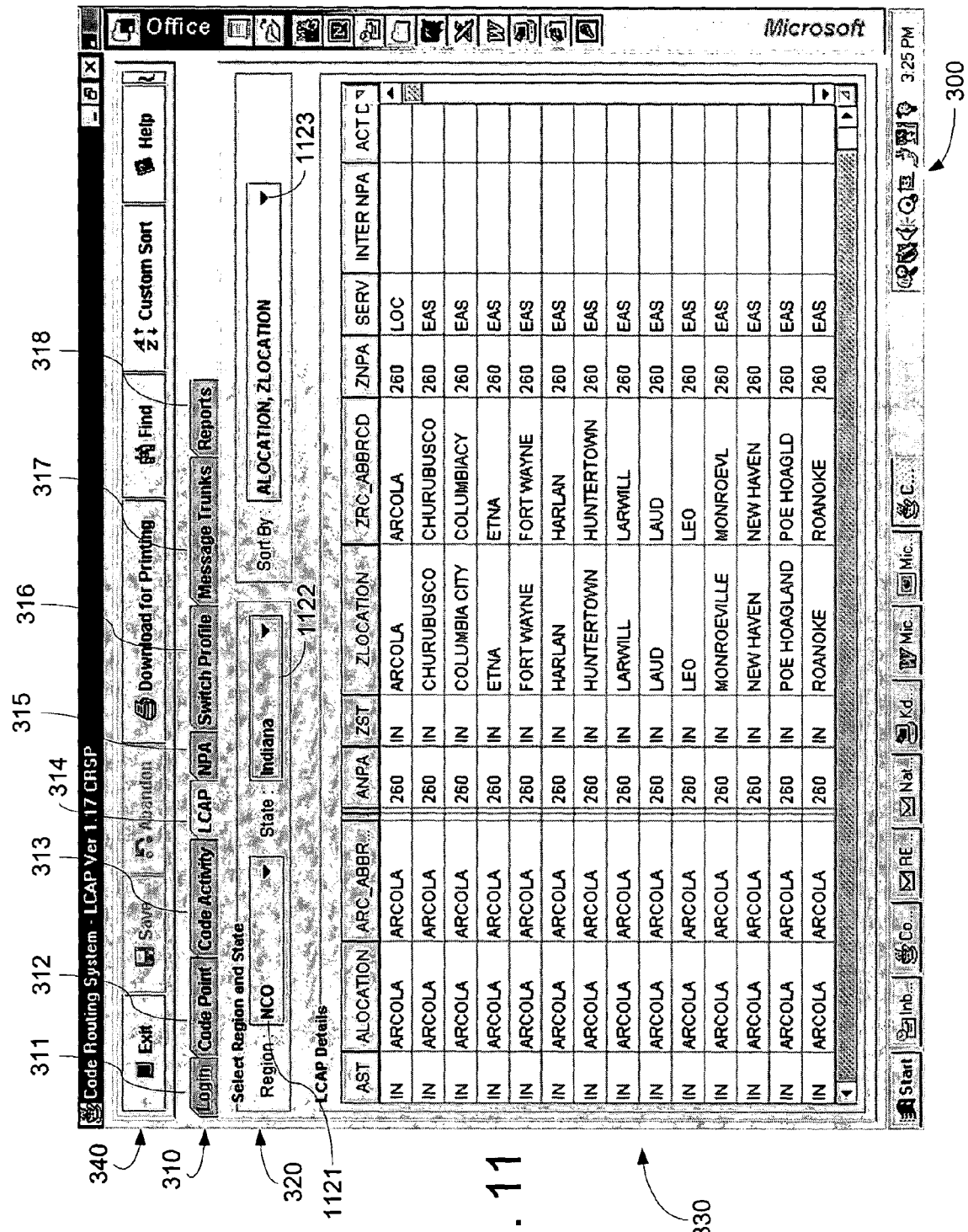
FIG. 11 illustrates a Graphical User Interface for software in accordance with the present invention.

Referring now to FIG. 11, the graphical User Interface 300 is illustrated after a user has selected the local calling area plan tab 314. Within area 320, the region pull-down menu 1121 and the state pull-down menu 1122 allow the user to select a region and state for display. The sort by pull-down menu 1123 allows the user to select various ways of organizing information in the display panel 330, such as from the Alocation, which is the origination point of a call, to the Zlocation, which is the termination point of a call. As can be seen in FIG. 11, various information is shown in display panel 330, including the origination state, or Astate, the origination location, or Alocation, the originating rate center abbreviation, or ARC_ABBR, the originating NPA code, or ANPA, the termination state, or Zstate, the termination location, or Zlocation, the termination rates center abbreviation or ZRC_ABBRCD, the termination NPA code, or ZNPA, the service type, and other information regarding routing and tolls applying to a call. Information relating to local calling area plans, such as illustrated in FIG. 11, are useful to assure that routing performed in switches properly accounts for users local calling area plans.

Figure 12:
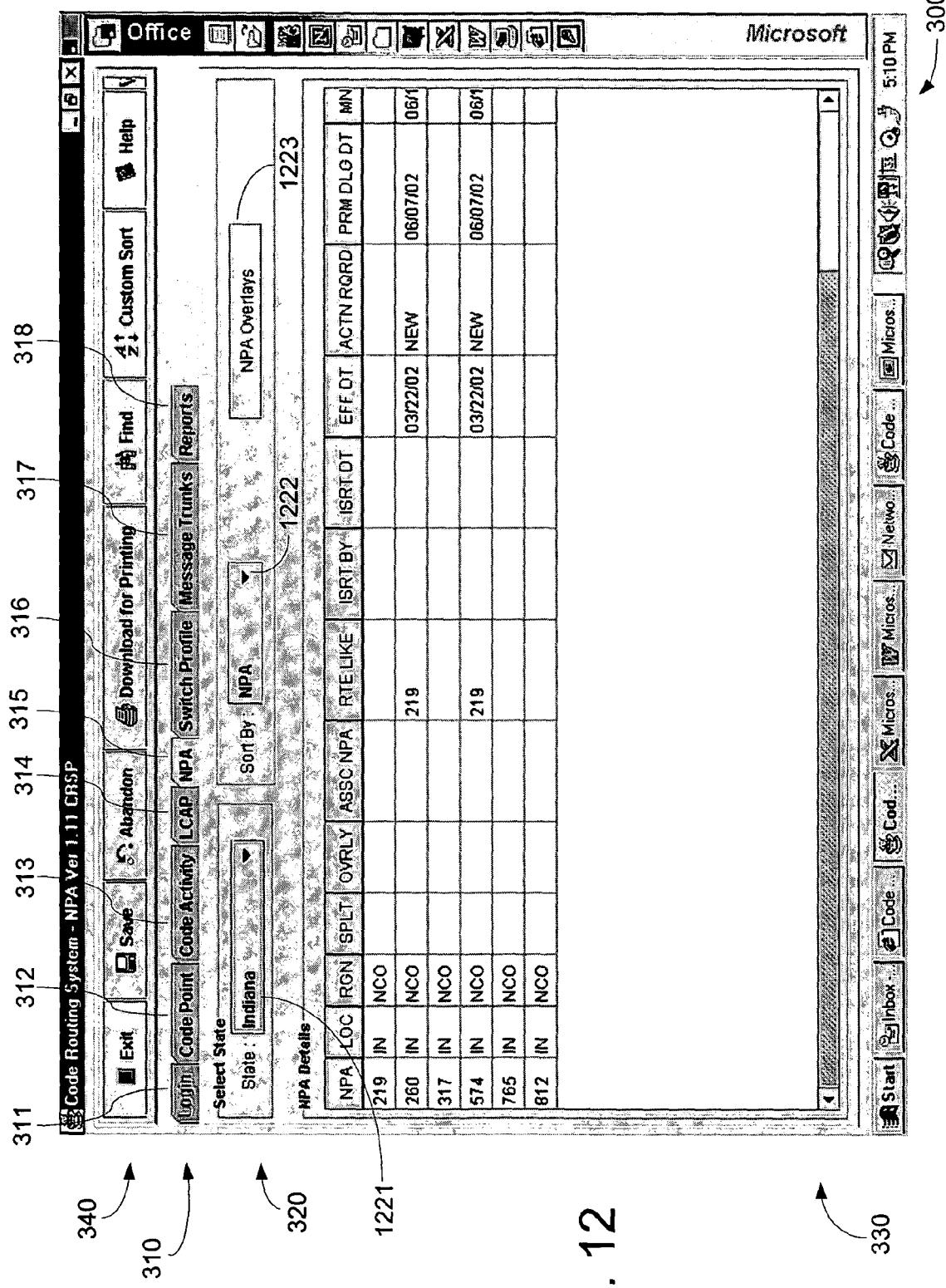
FIG. 12 illustrates a Graphical User Interface for software in accordance with the present invention.

Referring now to FIG. 12, a graphical User Interface 300 of software implementing a method in accordance with the present invention is illustrated with the selection of the NPA tab 315. State pull-down menu 1221 allows a user to select a state for which to display NPA information. The sort of pull-down menu 1222 allows a user to select how information displayed in display panel 330 is organized. The NPA overlays button 1223 allows a user to display information regarding NPA overlays.

Figure 13:
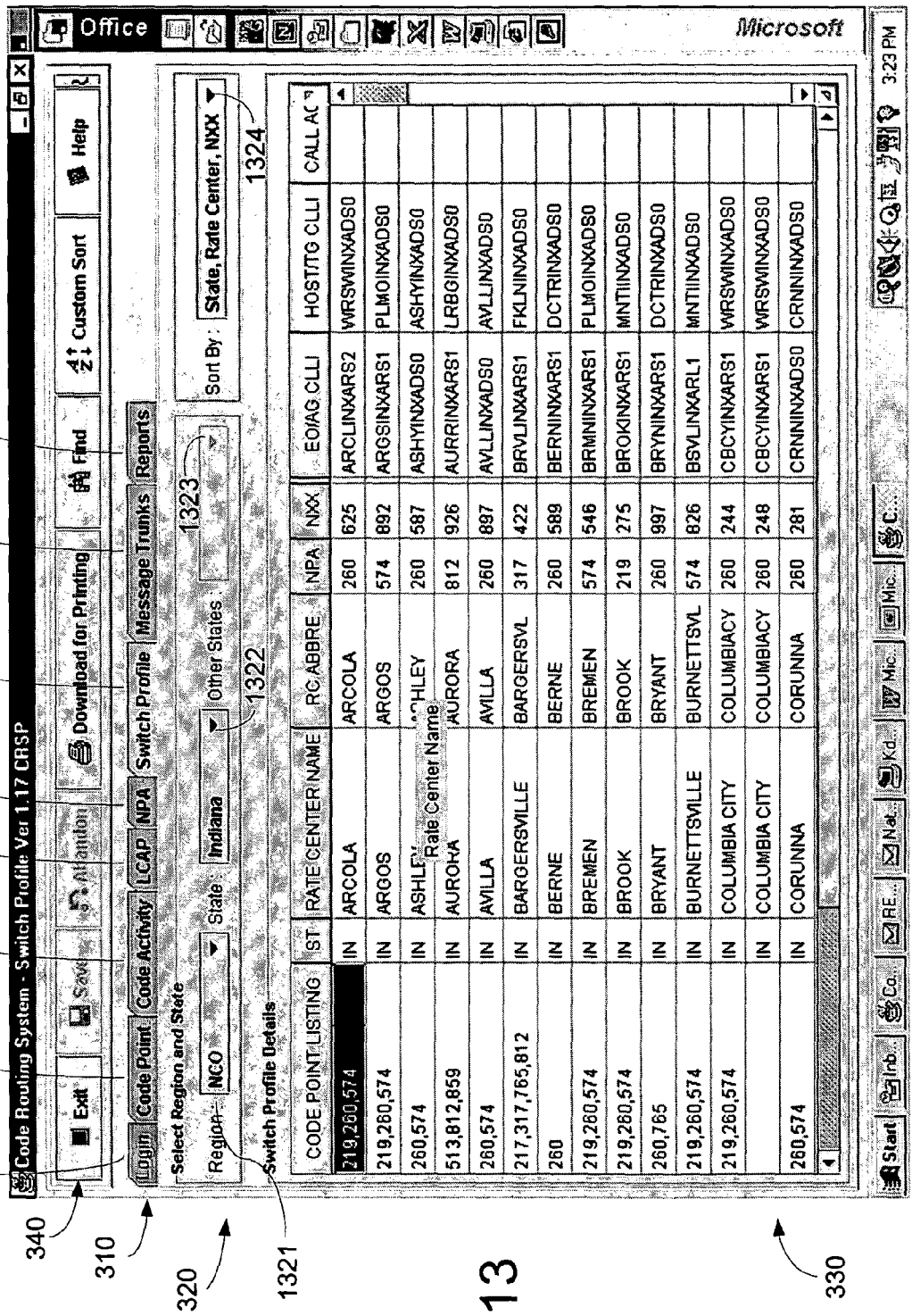
FIG. 13 illustrates a Graphical User Interface for software in accordance with the present invention.

Referring now to FIG. 13, a graphical User Interface 300 of one embodiment of computer software implementing a method in accordance with the present invention is illustrated after the selection of the switch profile tab 316. Area 320 allows a user to input information using the region pull-down menu 1321, and the state pull-down menu 1322. If applicable, additional information can be inputted using the other state pull-down menu 1323 and the sort by pull-down menu 324. Display panel 330 displays information relating to the switches included in the area defined by user through inputs within area 320. The displayed information may include the code point listing for each switch, the state for each switch, the rate center name corresponding to each switch, the rate code abbreviation for each switch, the NPA code for each switch, the NXX code for each switch, the end office CLLI code for each switch, the host CLLI code for each switch, and other information relevant to network design and translation in accordance with the present invention.

Figure 14:
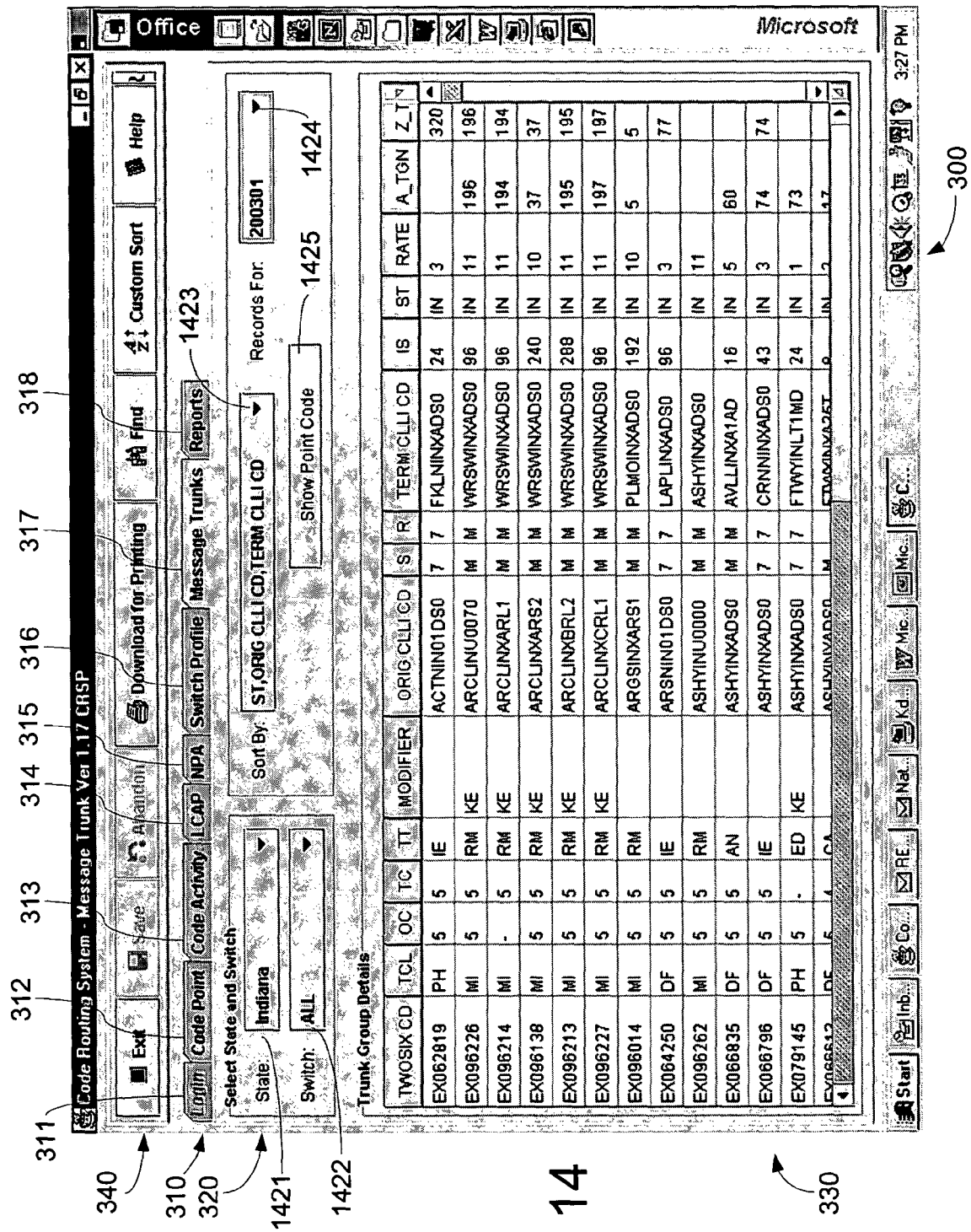
FIG. 14 illustrates a Graphical User Interface for software in accordance with the present invention.

Referring now to FIG. 14, a graphical User Interface 300 of one embodiment of computer software in accordance with the present invention is illustrated after the selection of the message trunk tab 317. Area 320 allows the user to input information using state pull-down menu 1421 and switch pull-down menu 1422. Sort by pull-down menu 1423 allows user to determine how information should be displayed in display panel 330. The records for pull-down menu 1421 allows user to further specify the information for display in panel 330. The show point code button 1425 allows the user to obtain point code information for a particular switch. The display panel 330 displays information relevant to the trunks within the parameters defined by a user in area 320. For example, the "twosix" code, which is unique for each trunk group, may be displayed. Other information describing each trunk group within the defined parameters may be displayed in display panel 330.

Figure 15:
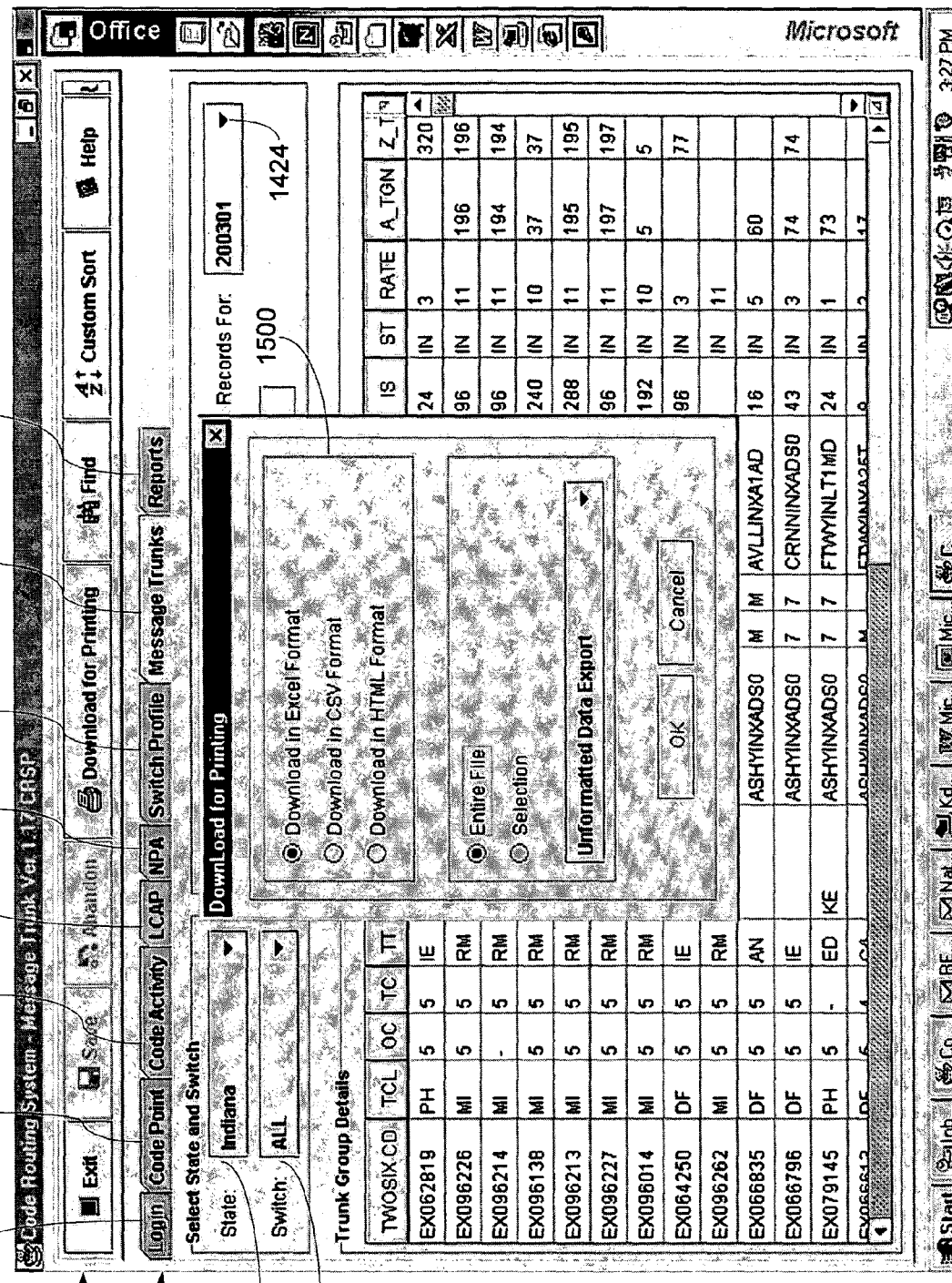
FIG. 15 illustrates a Graphical User Interface for software in accordance with the present invention.

Referring now to FIG. 15, the use of the buttons 340 is illustrated. As shown in FIG. 15, a user has selected the download for printing button, resulting in the download for printing pop-up window 1500 to appear. Pop-up window 1500 allows the user to indicate a particular file format desired for the download, as well as whether to download the entire file or only a selected portion of the file.

Figure 16:
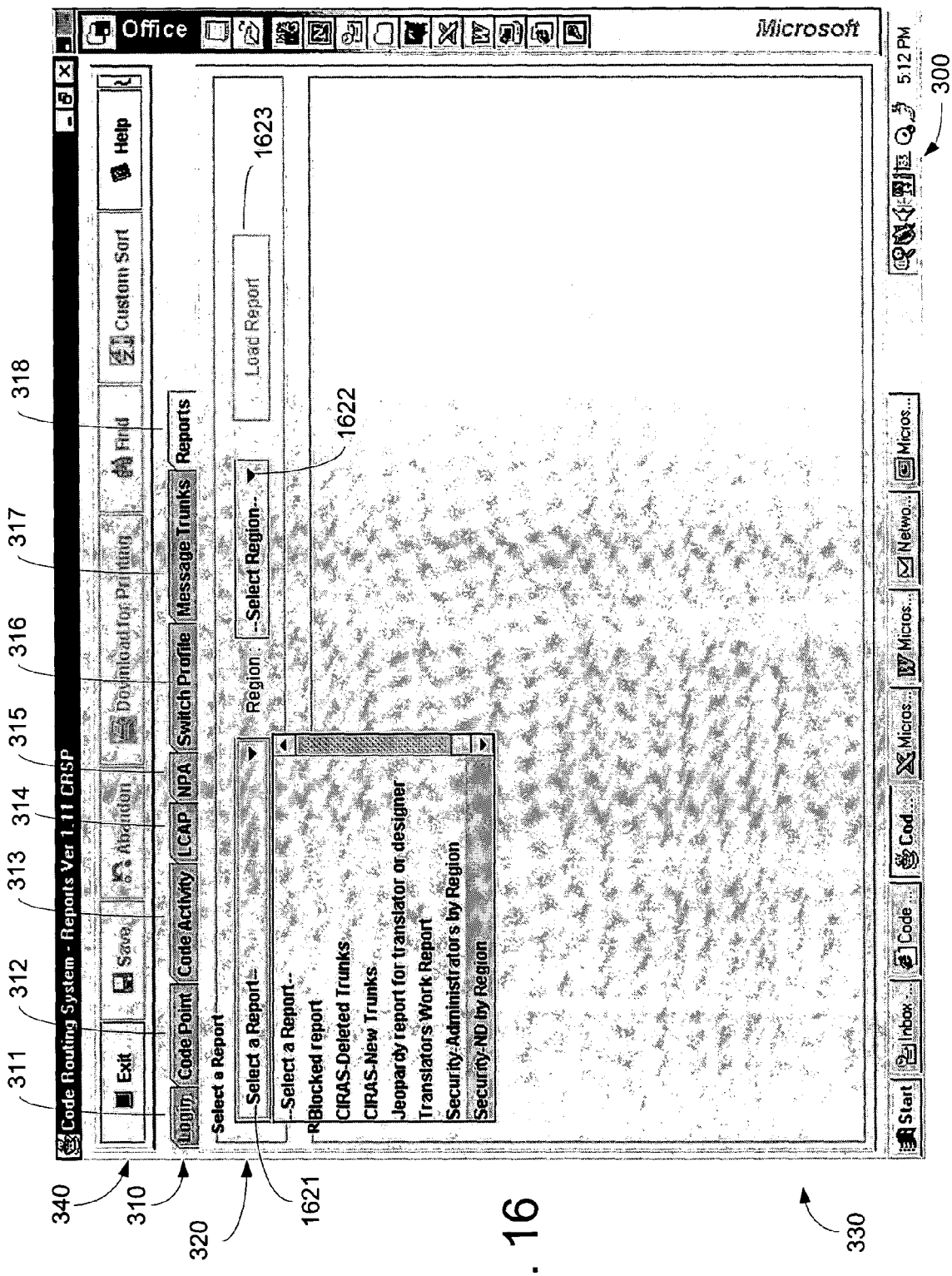
FIG. 16 illustrates a Graphical User Interface for software in accordance with the present invention.

Referring now to FIG. 16, a graphical User Interface 300 of one embodiment of computer software implementing a method in accordance with the present invention is shown with the reports tab 318 selected. The select a report pull-down menu 1621 allows a user to select the type of report to be created. The select region pull-down menu 1622 allows a user to select the geographical region of interest. Once a report type and region have been selected, the load report button 1623 may be used to load the report.

Figure 17:
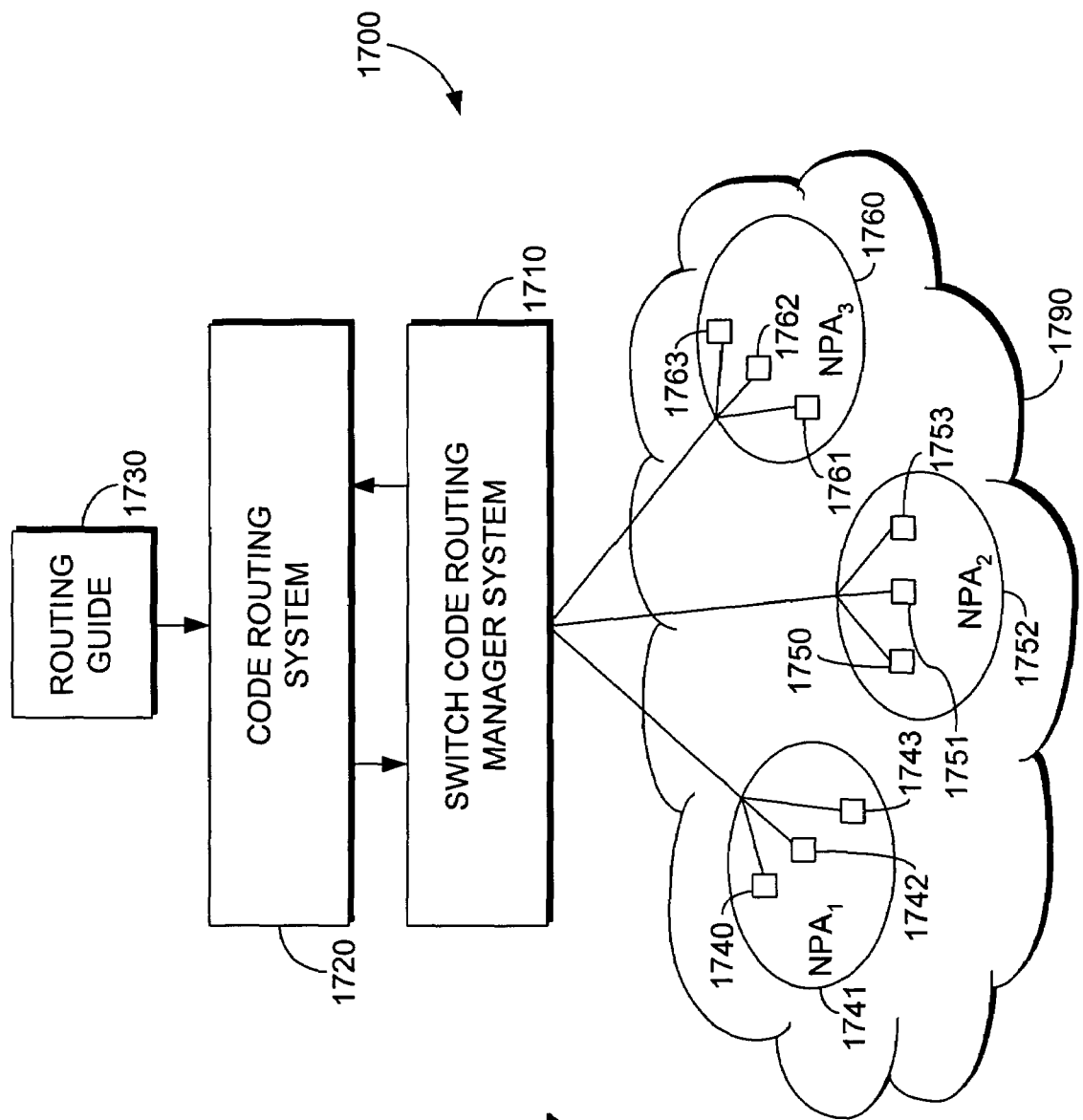
FIG. 17 illustrates a switch code routing manager system in accordance with the present invention.

Referring now to FIG. 17, a system 1700 for maintaining code routing information in a routing guide and the switches in a telecommunication network to correlate code routing information is illustrated. System 1700 may be used in conjunction with a code routing system 1720, such as the code routing system described above. System 1700 may comprise one or more computers executing machine-readable code embodied on one or more machine-readable media to cause the system 1700 to perform a method in accordance with the present invention, such as the example method described below. System 1700 may use a switch code routing manager system 1710 to obtain actual routing information from the telecommunication switches in the network and to compare that information to the routing information maintained by the code routing system 1720.

System 1700 may be useful in numerous circumstances where it is desirable to obtain actual routing information from the switches in a telecommunication network. For example, when a code routing system 1720 is first implemented there may be a risk of numerous discrepancies between the routing information in the code routing system 1720 and the switches. By way of further example, for any number of reasons the routing in a switch in a telecommunication network may not correspond to the desired routing maintained in a code routing system 1720. Such discrepancies may be discovered and corrected using a switch code routing manager system 1710 in accordance with the present invention. In addition to correcting discrepancies in routing information, the identification of routing discrepancies using the switch code routing manager system 1710 in accordance with the present invention may also enable network engineers and other telecommunication professionals to identify the source of those discrepancies and implement procedures to prevent such discrepancies from arising in the future.

System 1700 comprises a code routing system 1720 that receives information from a routing guide 1730, which may comprise a database of routing information from a LERG or other similar source. The routing guide may also be a database maintained by the code routing system 1720 itself. The switch code routing manager system 1710 receives code routing information from code routing system 1720 and also passes routing information obtained from switches to the code routing system 1720. Switch code routing manager system 1710 may access a plurality of switches in the telecommunication network 1790. Within the telecommunication network 1790, a first area code (also referred to as a first NPA code) 1740 may contain a plurality of switches, such as first switch 1741, second switch 1742, and third switch 1743. Telecommunication network 1790 may further comprise a second area code (also referred to as a second NPA code) 1750. Within the second area code 1750 there may be a plurality of switches, such as first switch 1751, second switch 1752, and third switch 1753. Within telecommunication network 1790 may also be a third area code (also referred to as a third NPA code) 1760. Within third area code 1760 there may be a plurality of switches, such as first switch 1761, second switch 1762, and third switch 1763. It should be realized that telecommunication network 1790 may contain far more area codes than the three illustrated in FIG. 17, and that each area code may contain far more switches than the three per area code illustrated in FIG. 17. Switch code routing manager system 1710 may access each of the plurality of switches in each area code to obtain the routing information on that switch. One method 1800 in accordance with the present invention that may be used with system 1700 is described below.

Figure 18:
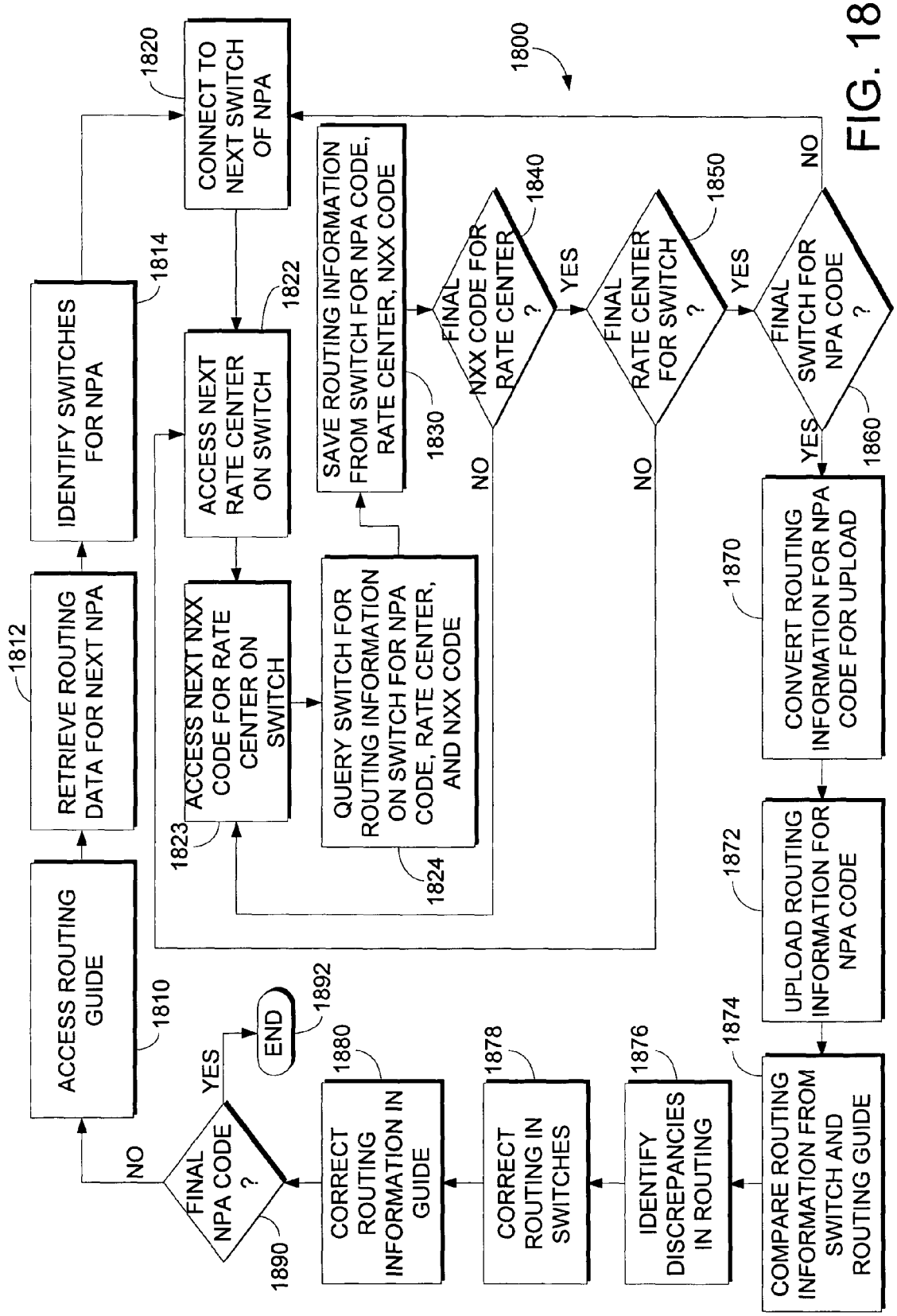
FIG. 18 illustrates a method in accordance with the present invention for obtaining routing information from switches, comparing that information to the routing information in a code routing system, and correcting routing discrepancies.

Referring now to FIG. 18, a method 1800 for obtaining routing information from switches, comparing that information to the routing information contained in a code routing system, and correcting any discrepancies is illustrated.

Method 1800 may be used with system 1700, for example by using computers operating appropriate software. In step 1810 the routing guide is accessed, for example by the switch code routing manager system. In step 1812, the switch code routing manager system retrieves routing data for the next NPA, or area code, from the routing guide. Step 1810 and step 1812 may be performed by a code routing manager system accessing a code routing system and retrieving information from one or more databases of the code routing system, by a code routing manager system accessing other routing guides, or by a code routing manager system indirectly accessing other routing guides through an intermediary, such as a code routing system. This routing information for the NPA may be in any suitable format, such as commercially available database formats or specially designed formats. The routing information retrieved may include the NPA codes, rate centers, and NXX codes, and the associated switches. Step 1812 may retrieve routing data for NPAs in any order, such as numerical, geographical, or any other user-defined order. If method 1800 has not already retrieved routing information for any NPA code, method 1800 may retrieve routing data for the first NPA code in step 1812.

In step 1814 the routing data for the NPA code is used to identify switches for that NPA code. In step 1820, the switch code routing manager system connects to the next switch for that NPA code. If step 1820 is being performed for the first time for that NPA code the switch code routing manager system may connect to the first switch for that NPA code. The order in which the switch code routing manager system connects to switches may be defined in a variety of ways, such as in a numerical or geographic order, any of which may be used with the present invention.

In step 1822 the switch code routing manager system accesses the next rate center on the switch. If step 1822 is being performed for the first time for the switch, the first rate center for that switch may be accessed in step 1822. The order in which rate centers are accessed may be determined in a number of ways, such as numerical or geographic order, any of which may be used with the present invention.

In step 1823 the switch code routing manager system accesses the next NXX code for the rate center on the switch. If step 1823 is being performed for the first time for the rate center for the switch, the first NXX code may be accessed. The order in which NXX codes are accessed may be determined in a variety of ways, such as numerical or geographic order, any of which may be used with the present invention.

In step 1824 the switch code routing manager system queries the switch for routing information on the switch for the NPA code, rate center and NXX code. The protocol used in step 1824 may vary depending, for example, on the type of switch to be queried.

In step 1830 the switch code routing manager system saves the routing information retrieved from the switch for the NPA code, rate center, and NXX code. In step 1840 the switch code routing manager system uses the routing information for the NPA code retrieved in step 1812 to determine whether the last processed NXX code is the last NXX code for the rate center. If the last processed NXX code is not the last NXX code for the rate center, method 1800 returns to step 1823 and the next NXX code for the rate center is accessed. If in step 1840 switch code routing manager system determines that the last NXX code was the final NXX code for the rate center method 1800 proceeds to step 1850. In step 1850 switch code routing manager system uses the routing information for the NPA code retrieved in step 1812 to determine whether the last processed rate center is the last rate center for the switch. If the last processed rate center is not the last rate center on the switch, method 1800 returns to step 1822 and the next rate center on the switch is accessed. If the conclusion of step 1850 is that the last processed rate center was the final rate center on the switch, method 1800 proceeds to step 1860. Then in step 1860 switch code routing manager system uses the routing information for the NPA code retrieved in step 1812 to determine whether the last processed switch is the final switch for the NPA code. If the conclusion of step 1860 is that the last processed switch is not the last switch for the NPA code, method 1800 returns to step 1820 and connects to the next switch for the NPA code. If the conclusion of step 1860 is that the last processed switch is the final switch for the NPA code, method 1800 may proceed.

In step 1870 the routing information saved in step 1830 is converted for NPA code upload. The routing information converted in step 1870 may be converted into any format suitable for comparison with the routing information found in a code routing system used in conjunction with the present invention. This format may be any suitable database format, spreadsheet format, text file, or any other format implemented with the present invention. In step 1872 the converted routing information for the NPA code is uploaded to the code routing system. In step 1874 the uploaded code routing information is compared to the routing information in the code routing system.

In step 1876 discrepancies in routing between the uploaded routing information and the code routing system information are identified. Step 1876 may be performed by placing routing discrepancies in a separate file, by making indicia indicating the discrepancies in an existing file, or by other means. Step 1876 may further determine whether a discrepancy is due to an error in the routing guide or an error in the routing of one or more switches. His determination may also be performed as a separate step. In making such a determination, it may be clear whether step 1878 should be performed to correct routing in the switch or whether step 1880 should be performed to correct the routing information in the routing guide. For example, the routing in a switch may be obviously inoperable, for example due to likely human error. Alternatively, the routing information contained in the routing guide may clearly be due to a typographical error or other easily identified mistake. In other circumstances, analysis and expertise may be required in the performance of step 1878 and step 1880.

In step 1878 the routing discrepancies may be corrected in the switches, and in step 1880 the routing discrepancies may be corrected in the routing guide. Step 1878 and step 1880 may be performed simultaneously or separately, and may be automated or may be performed by telecommunication network engineers and other personnel.

In step 1890, the switch code routing manager system determines whether the last processed NPA code is the last NPA code for it to process. If the last processed NPA code is the last NPA code, method 1800 ends in step 1892. If the result of step 1890 is that the last processed NPA code is not the final NPA code to process, method 1800 returns to step 1810 and switch code routing manager system again accesses routing guide in step 1810. Method 1800 thereafter proceeds as described above for the next NPA code.

Method 1800 provides an orderly and substantially automated method for correlating routing information from a routing guide to the routing information on the switches of a telecommunication network. Method 1800 proceeds by extracting routing information from switches organized by NPA code, rate center, and NXX code. While other switch groupings may be used in accordance with the present invention, such as geographical groupings of switches, the method described herein effectively works in conjunction with the present code system implemented in telecommunication networks. Some steps, such as step 1870 of converting routing information may be omitted if no such conversion is necessary for comparison of the routing information extracted from switches in the routing information found in the routing guide. Other steps described herein may be omitted or modified without departing from the scope of the invention.

What is claimed is:

1. A method for maintaining code routing information for a routing guide and for the switches in a telecommunication network, the method comprising:
   retrieving code routing information from a routing guide;
   retrieving code routing information from switches in the telecommunication network corresponding to the code routing information received from the routing guide; and
   identifying discrepancies between the code routing information received from the routing guide and the code routing information retrieved from switches in the telecommunication network.

2. The method for maintaining code routing information of claim 1, further comprising:
   correcting routing errors in the routing guide; and
   correcting routing errors in switches in the telecommunication network.

3. The method for maintaining code routing information of claim 2, wherein the routing guide comprises a routing database containing LERG routing data.

4. The method for maintaining code routing information of claim 2, wherein retrieving code routing information from switches in the telecommunication network corresponding to the code routing information received from the routing guide comprises:
   iteratively accessing switches and retrieving routing information from each switch for each area code in the routing guide until all switches in each area code in the routing guide has been accessed.

5. A method for maintaining code routing information for a routing guide and for the switches in a telecommunication network, the method comprising:
   retrieving routing information for an NPA code from the routing guide;
   connecting to a switch for the NPA code;
   accessing a rate center on the switch for the NPA code;
   accessing an NXX code for the rate center on the switch for the NPA code;
   querying the switch for routing information for the NXX code for the rate center on the switch for the NPA code;
   saving routing information responsive to the query for the NXX code for the rate center on the switch for the NPA code;
   iteratively repeating:
      accessing an additional NXX code for the rate center on the switch for the NPA code;
      querying the switch for routing information for the additional NXX code for the rate center on the switch for the NPA code; and
      saving routing information responsive to the query for the additional NXX code for the rate center on the switch for the NPA code;
   until routing information for all NXX codes for the rate center on the switch for the NPA code has been saved.

6. The method for maintaining code routing information of claim 5, further comprising:
   iteratively repeating:
      accessing a rate center on the switch for the NPA code;
      accessing a different NXX code for the rate center on the switch for the NPA code;
      querying the switch for routing information for the different NXX code for the rate center on the switch for the NPA code;
      saving routing information responsive to the query for the different NXX code for the rate center on the switch for the NPA code; and
      iteratively repeating:
         accessing a further NXX code for the rate center on the switch for the NPA code;
         querying the switch for routing information for the further NXX code for the rate center on the switch for the NPA code; and
         saving routing information responsive to the query for the further NXX code for the rate center on the switch for the NPA code;
      until routing information for all NXX codes for the rate center on the switch for the NPA code has been saved;
   until routing information for all rate centers on the switch for the NPA code has been saved.

7. The method for maintaining code routing information of claim 6, further comprising:
   comparing the routing information from the routing guide to the routing information saved from the switches; and
   identifying discrepancies in the routing information from the routing guide and the routing information saved from the switches.

8. The method for maintaining code routing information of claim 7, further comprising:
   correcting identified discrepancies in the routing guide.

9. The method for maintaining code routing information of claim 7, further comprising:
   correcting identified discrepancies in the routing of the switches.

10. The method for maintaining code routing information of claim 7, further comprising:
    determining which identified discrepancies are errors in the routing guide and which identified discrepancies are errors in the routing of the switches;
    correcting errors in the routing guide; and
    correcting errors in the routing of the switches.

11. The method for maintaining code routing information of claim 6, further comprising:
    comparing the routing information from the routing guide to the routing information saved from the switches; and
    identifying discrepancies in the routing information from the routing guide and the routing information saved from the switches.

12. The method for maintaining code routing information of claim 11, further comprising:
    correcting identified discrepancies in the routing guide.

13. The method for maintaining code routing information of claim 11, further comprising:
    correcting identified discrepancies in the routing of the switches.

14. The method for maintaining code routing information of claim 11, further comprising:
    determining which identified discrepancies are errors in the routing guide and which identified discrepancies are errors in the routing of the switches;
    correcting errors in the routing guide; and
    correcting errors in the routing of the switches.

15. At least one machine-readable media containing machine-readable code embodied thereon for causing a system to perform a method for maintaining code routing information for a routing guide and for switches in a telecommunication network, the method comprising:

retrieving code routing information from a routing guide;

retrieving code routing information from switches in the telecommunication network corresponding to the code routing information received from the routing guide; and identifying discrepancies between the code routing information received from the routing guide and the code routing information retrieved from switches in the telecommunication network.

16. The at least one machine-readable media of claim 15, the method further comprising:

correcting routing errors in the routing guide; and correcting routing errors in switches in the telecommunication network.

17. The at least one machine-readable media of claim 16, wherein the step of the method of retrieving code routing information from switches in the telecommunication network corresponding to the code routing information received from the routing guide comprises:

iteratively accessing switches and retrieving routing information from each switch for each area code in the routing guide until all switches in each area code in the routing guide has been accessed.

18. At least one machine-readable media containing machine-readable code embodied thereon for maintaining code routing information for a routing guide and for switches in a telecommunication network, the method comprising:

retrieving routing information for an NPA code from the routing guide;

connecting to a switch for the NPA code;

accessing a rate center on the switch for the NPA code;

accessing an NXX code for the rate center on the switch for the NPA code;

querying the switch for routing information for the NXX code for the rate center on the switch for the NPA code;

saving routing information responsive to the query for the NXX code for the rate center on the switch for the NPA code;

iteratively repeating:

accessing an additional NXX code for the rate center on the switch for the NPA code;

querying the switch for routing information for the additional NXX code for the rate center on the switch for the NPA code; and saving routing information responsive to the query for the additional NXX code for the rate center on the switch for the NPA code;

until routing information for all NXX codes for the rate center on the switch for the NPA code has been saved.

19. The at least one machine-readable media of claim 18, the method further comprising:

iteratively repeating:

accessing a rate center on the switch for the NPA code;

accessing a different NXX code for the rate center on the switch for the NPA code;

querying the switch for routing information for the different NXX code for the rate center on the switch for the NPA code;

saving routing information responsive to the query for the different NXX code for the rate center on the switch for the NPA code; and iteratively repeating:

accessing a further NXX code for the rate center on the switch for the NPA code;

querying the switch for routing information for the further NXX code for the rate center on the switch for the NPA code; and saving routing information responsive to the query for the further NXX code for the rate center on the switch for the NPA code;

until routing information for all NXX codes for the rate center on the switch for the NPA code has been saved;

until routing information for all rate centers on the switch for the NPA code has been saved.

20. The at least one machine-readable media of claim 18, the method further comprising:

comparing the routing information from the routing guide to the routing information saved from the switches; and identifying discrepancies in the routing information from the routing guide and the routing information saved from the switches.

21. The at least one machine-readable media of claim 20, the method further comprising:

correcting identified discrepancies in the routing guide.

22. The at least one machine-readable media of claim 20, the method further comprising:

correcting identified discrepancies in the routing of the switches.

23. The at least one machine-readable media of claim 20, the method further comprising:

determining which identified discrepancies are errors in the routing guide and which identified discrepancies are errors in the routing of the switches;

correcting errors in the routing guide; and correcting errors in the routing of the switches.

* * * * *